United States Patent [19]
Lucas et al.

[11] Patent Number: 5,424,755
[45] Date of Patent: Jun. 13, 1995

[54] DIGITAL SIGNAL VIDEO COLOR COMPRESSION METHOD AND APPARATUS

[76] Inventors: Bruce D. Lucas, 2408 Mill Pond Rd., Yorktown Heights, N.Y. 10598; Alexander G. MacInnis, 8414 Lone Mesa, Austin, Tex. 78759; Paul S. Yosim, 18750 Cape Sable Dr., Boca Raton, Fla. 33498

[21] Appl. No.: 904,097

[22] Filed: Jun. 25, 1992

[51] Int. Cl.$^6$ .............................................. G09G 3/02
[52] U.S. Cl. ................................... 345/155; 345/153; 348/61; 358/518
[58] Field of Search ................ 340/703, 793; 358/455, 358/456, 457, 458, 459, 75, 80, 518, 520; 345/155, 153, 186; 348/61

[56] References Cited

U.S. PATENT DOCUMENTS

| | | | |
|---|---|---|---|
| 4,843,458 | 7/1989 | Ito | 358/75 |
| 4,989,079 | 1/1991 | Ito | 358/75 |
| 5,077,605 | 12/1991 | Ikeda et al. | 358/75 |
| 5,170,152 | 12/1992 | Taylor | 345/155 |

*Primary Examiner*—Alvin E. Oberley
*Assistant Examiner*—Minsun Oh
*Attorney, Agent, or Firm*—Daniel E. McConnell

[57] ABSTRACT

This invention provides a method of and apparatus for compressing digital video color signals derived from a natural image and generating display signals for a color image composed of pixels derived from the compressed signals in which digital color signals representative of color depth intensities of three colors for each pixel to be displayed, each color signal having at least four bits representing the color intensity of a corresponding color for a corresponding pixel and arranged from most to least significant bits, are received; a digital dither signal for each pixel to be displayed is generated; a selected number of the most significant bits of each received color signal are summed with the corresponding generated dither signal; a selected number of the least significant bits of the summed color and dither signals are discarded to compress the corresponding received color signal; the compressed color signals related to a common pixel are concatenated to generate a digital output signal having a predetermined bit length less than the summed bit lengths of the received digital color signals and representative of the depth intensities of three colors for the common pixel; and analog display driver signals representative of the color intensities of pixels to be displayed are generated by selecting from a color lookup table stored in a digital to analog converter analog signals corresponding to the stored output signals.

42 Claims, 5 Drawing Sheets

DIGITAL SIGNAL VIDEO COLOR COMPRESSION METHOD AND APPARATUS

TECHNICAL FIELD

This invention relates to digital video signals such as may be processed by digital apparatus including personal computer systems driving video displays, and more particularly to compression of the color values embodied in such signals. Such compression facilitates the display of images derived from natural image video (as hereinafter defined) in which the range of color values available for display far exceeds the ready capability of available display drivers.

BACKGROUND TO THE INVENTION

Personal computer systems in general and IBM personal computers in particular have attained widespread use for providing computer power to many segments of today's modern society. Personal computer systems can usually be defined as a desk top, floor standing, or portable microcomputer that consists of a system unit having a single system processor and associated volatile and non-volatile memory, a display monitor, a keyboard, one or more diskette drives, a fixed disk storage, and an optional printer. One of the distinguishing characteristics of these systems is the use of a motherboard or system planar to electrically connect these components together. These systems are designed primarily to give independent computing power to a single user and are inexpensively priced for purchase by individuals or small businesses. Examples of such personal computer systems are IBM's PERSONAL COMPUTER AT and IBM's PERSONAL SYSTEM/2 Models 25, 30, 35, 40, L40SX, 50, 55, 56, 57, 65, 70, 80, 90 and 95.

These systems can be classified into two general families. The first family, usually referred to as Family I Models, use a bus architecture exemplified by the IBM PERSONAL COMPUTER AT and other "IBM compatible" machines. The second family, referred to as Family II Models, use IBM's MICRO CHANNEL bus architecture exemplified by IBM's PERSONAL SYSTEM/2 Models 50 through 95. The Family I models typically have used the popular INTEL 8088 or 8086 microprocessor as the system processor. These processors have the ability to address one megabyte of memory. Some Family I models and the Family II models typically use the high speed INTEL 80286, 80386, and 80486 microprocessors which can operate in a real mode to emulate the slower speed INTEL 8086 microprocessor or a protected mode which extends the addressing range from 1 megabyte to 4 Gigabytes for some models. In essence, the real mode feature of the 80286, 80386, and 80486 processors provide hardware compatibility with software written for the 8086 and 8088 microprocessors.

As used herein, the phrase "natural image video" refers to video signals which can be displayed under the protocols established by the National Television Standards Committee and comparable organizations around the world. Such video signals are commonly derived from video cameras capable of capturing images from naturally occurring events, and thus lead to the "natural image video" designation. However, such images have in recent time become susceptible to being digitized and manipulated or even generated as digital signals. Thus the interface between natural image video and computer displays arises.

In the arena of computer displays, an image is composed of a plurality of picture elements or pixels, each composed (for purposes of a color display of the type to which the present invention relates) of three colors, usually red, green and blue. In most conventional display devices, the brightness of a particular pixel is determined by an analog signal, namely the voltage applied to three electron beams, one representing each of red, green and blue. Because the circuits of the computer driving the display handle signals in digital form, a digital value is given for the depth of color intensity of each of the three colors, with the number of bits used to identify the characteristics of a pixel controlling the degree of depth available. The simplest level uses eight bits for color depth information, usually assigning three bits for each of red and green and two bits for blue. This level may be identified as RGB8.

In converting from the digital video signals to the analog signals used to drive the display device, a digital to analog converter is provided with registers in which is stored a color lookup table (or CLUT) of digital values from which corresponding analog signals are derived for each pixel. Where the digital signals are RGB8, the converter will use a CLUT8 conversion. Various graphics display standards in use in the computer industry enable varying degrees of color depth intensity, often as a tradeoff of definition available on screen. While RGB8 and CLUT8 operation are perhaps the most widely known and used, and thus the most economical to adopt and practice, RGB16 and RGB24 (using sixteen and twenty four bits, respectively to represent color depth intensities) are also known and used.

It can be difficult to map the 16.7 million colors available in a natural image into the limited color space provided by a conventional computer display graphic mode, such as a CLUT8 graphic mode. Such modes are available on computer display driver systems meeting specifications known in the computer industry as VGA and XGA (the latter being a registered trademark of the IBM Corporation, the owner of the invention described here). The problem is compounded when the requirement is added that live full motion must be supported. This means processing must take place real time (more than 12 million pixels per second) on unpredictable and uncontrollable image sequences at a reasonable cost with the technology available.

There may also be a realistic operating system requirement that out of the 256 color palette available in CLUT8, entries at both the bottom and top of the palette should not be changed to accommodate natural image display. They are reserved for system colors that other applications in a windowing environment expect to remain fixed or available for palette animation.

BRIEF DESCRIPTION OF THE INVENTION

With the foregoing as background, the present invention provides a method of and apparatus for compressing digital video color signals derived from a natural image and generating display signals for a color image composed of pixels derived from the compressed signals in which digital color signals representative of color depth intensities of three colors for each pixel to be displayed, each color signal having at least four bits representing the color intensity of a corresponding color for a corresponding pixel and arranged from most to least significant bits, are received; a digital dither signal for each pixel to be displayed is generated; a selected number of the most significant bits of each received color signal are summed with the corresponding generated dither signal; a selected number of the least significant bits of the summed color and dither signals are discarded to compress the corresponding received color signal; the compressed color signals related to a common pixel are concatenated to generate a digital output signal having a predetermined bit length less than the summed bit lengths of the received digital color signals and representative of the depth intensities of three colors for the common pixel; and analog display driver signals representative of the color intensities of pixels to be displayed are generated by selecting from a color lookup table stored in a digital to analog converter analog signals corresponding to the stored output signals. In realizing this method and apparatus, provision can be made for preserving a number of colors used by an operating system as system colors.

BRIEF DESCRIPTION OF THE DRAWINGS

Some of the objects of the invention having been stated, other objects will appear as the description proceeds, when taken in connection with the accompanying drawings, in which.

DETAILED DESCRIPTION OF INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 1:
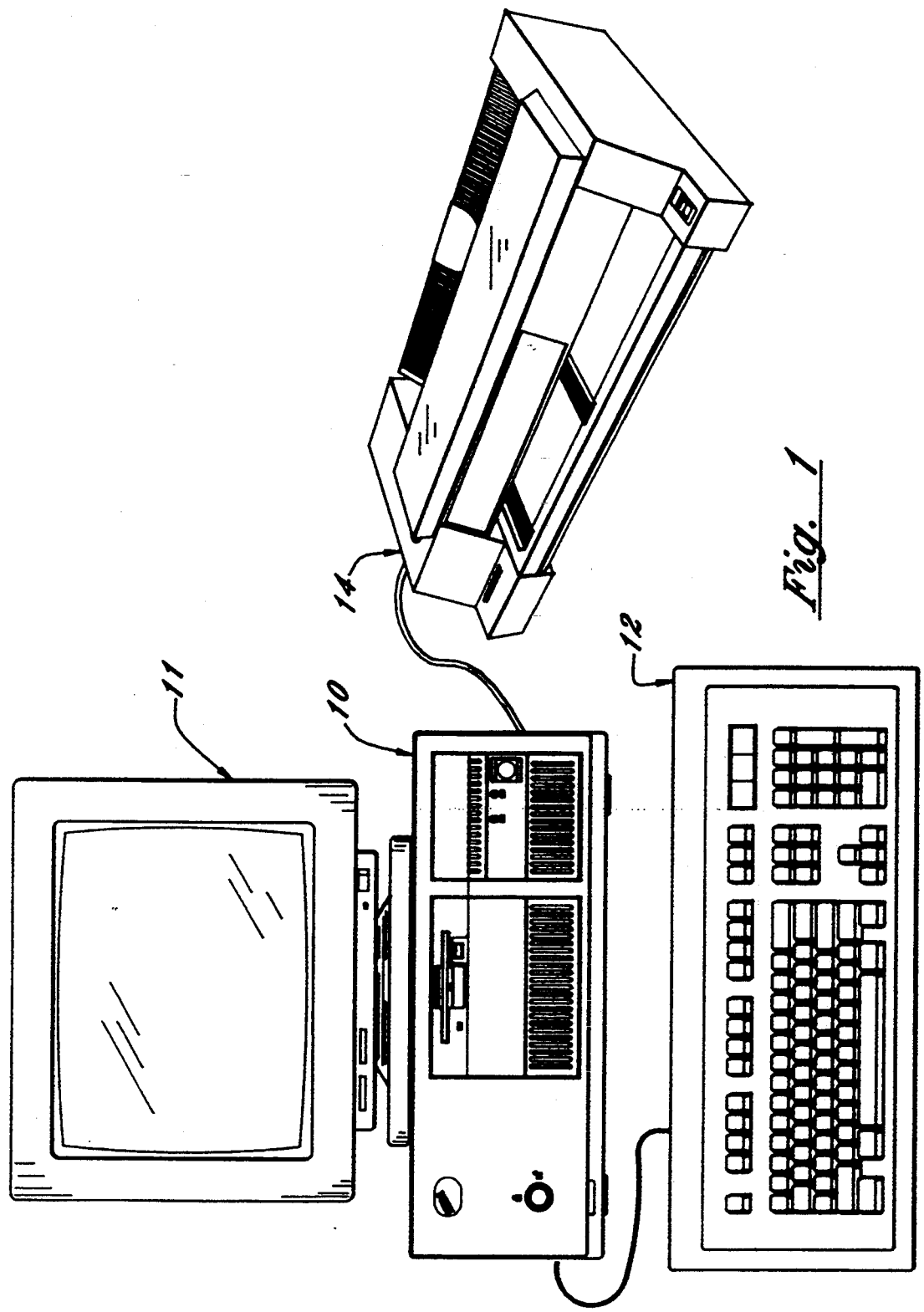
FIG. 1 is a perspective view of a personal computer embodying this invention.
Figure 2:
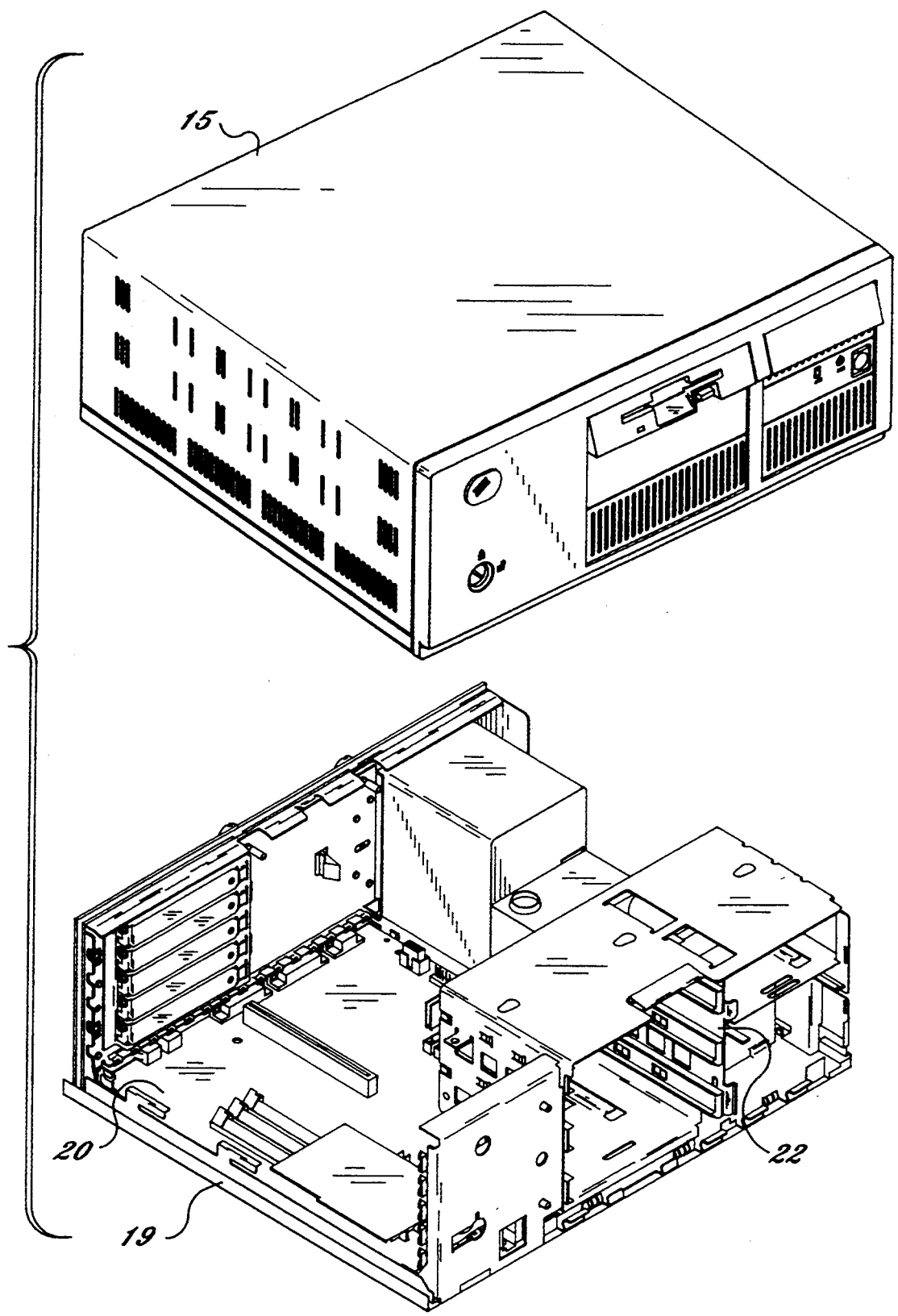
FIG. 2 is an exploded perspective view of certain elements of the personal computer of FIG. 1 including a chassis, a cover, and a planar board and illustrating certain relationships among those elements.

Referring now more particularly to the accompanying drawings, a microcomputer embodying the present invention is there shown and generally indicated at 10 (FIG. 1). As mentioned hereinabove, the computer 10 may have an associated monitor 11, keyboard 12 and printer or plotter 14. The computer 10 has a cover 15 which cooperates with a chassis 19 in defining an enclosed, shielded volume for receiving electrically powered data processing and storage components for processing and storing digital data, as shown in FIG. 2. At least certain of these components are mounted on a multilayer planar 20 or motherboard which is mounted on the chassis 19 and provides a means for electrically interconnecting the components of the computer 10 including those identified above and such other associated elements as floppy disk drives, various forms of direct access storage devices, accessory cards or boards, and the like.

The chassis 19 has a base and a rear panel (FIG. 2) and defines at least one open bay for receiving a data storage device such as a disk drive for magnetic or optical disks, a tape backup drive, or the like. In the illustrated form, an upper bay 22 is adapted to receive peripheral drives of a first size (such as those known as 3.5 inch drives). A floppy disk drive, a removable media direct access storage device capable of receiving a diskette inserted thereinto and using the diskette to receive, store and deliver data as is generally known, may be provided in the upper bay 22.

Figure 3:
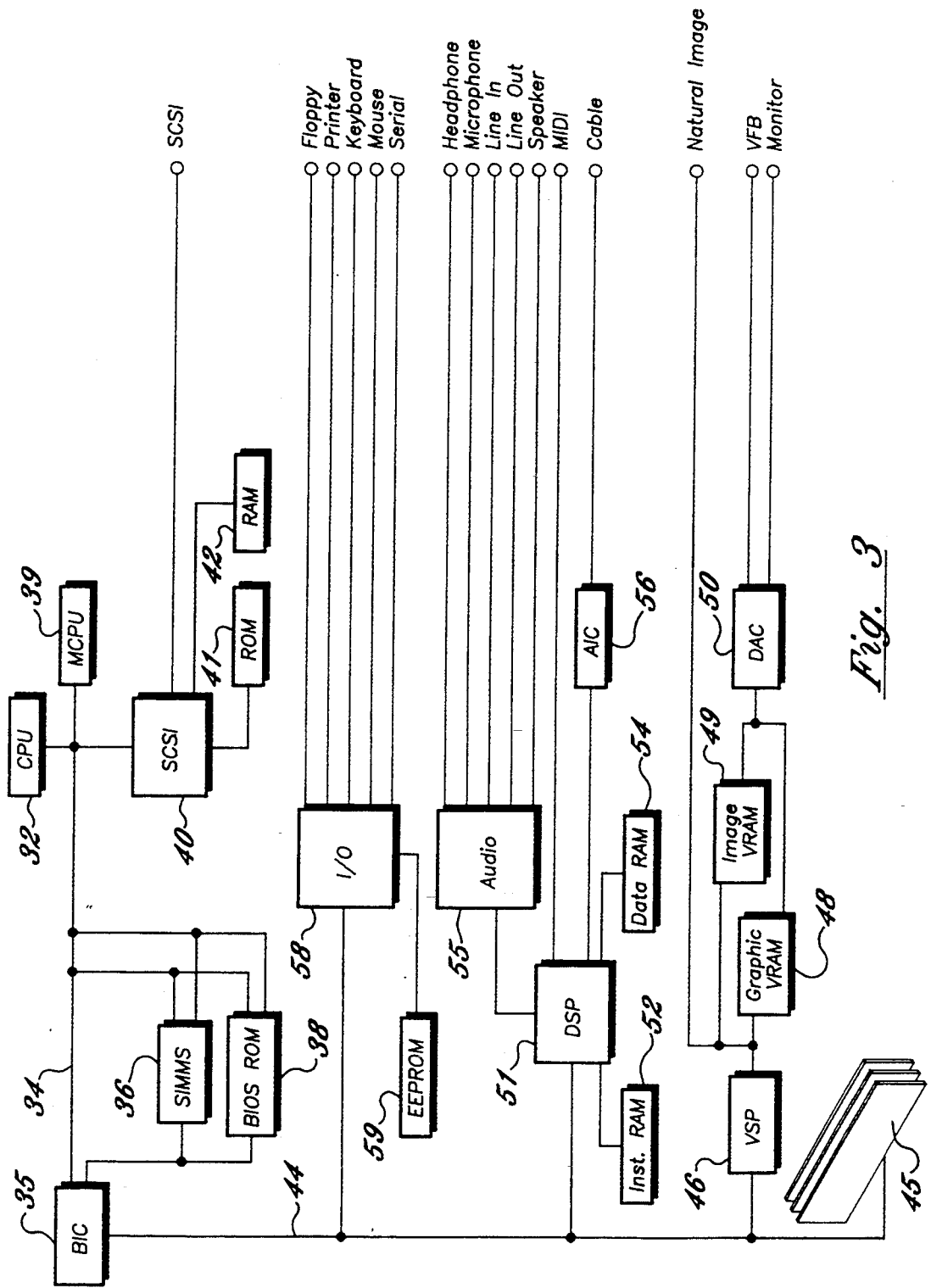
FIG. 3 is a schematic view of certain components of the personal computer of FIGS. 1 and 2.

Prior to relating the above structure to the present invention, a summary of the operation in general of the personal computer system 10 may merit review. Referring to FIG. 3, there is shown a block diagram of a personal computer system illustrating the various components of the computer system such as the system 10 in accordance with the present invention, including components mounted on the planar 20 and the connection of the planar to the I/O slots and other hardware of the personal computer system. Connected to the planar is the system processor 32. While any appropriate microprocessor can be used as the CPU 32, one suitable microprocessor is the 80386 which is sold by INTEL. The CPU 32 is connected by a high speed CPU local bus 34 to a bus interface control unit 35, to volatile random access memory (RAM) 36 here shown as Single Inline Memory Modules (SIMMs) and to BIOS ROM 38 in which is stored instructions for basic input/output operations to the CPU 32. The BIOS ROM 38 includes the BIOS that is used to interface between the I/O devices and the operating system of the microprocessor 32. Instructions stored in ROM 38 can be copied into RAM 36 to decrease the execution time of BIOS.

While the present invention is described hereinafter with particular reference to the system block diagram of FIG. 3, it is to be understood at the outset of the description which follows that it is contemplated that the apparatus and methods in accordance with the present invention may be used with other hardware configurations of the planar board. For example, the system processor could be an Intel 80286 or 80486 microprocessor.

Returning now to FIG. 3, the CPU local bus 34 (comprising data, address and control components) also provides for the connection of the microprocessor 32 with a math coprocessor 39 and a Small Computer Systems Interface (SCSI) controller 40. The SCSI controller 40 may, as is known to persons skilled in the arts of computer design and operation, be connected or connectable with Read Only Memory (ROM) 41, RAM 42, and suitable external devices of a variety of types as facilitated by the I/O connection indicated to the right in the Figure. The SCSI controller 40 functions as a storage controller in controlling storage memory devices such as fixed or removable media electromagnetic storage devices (also known as hard and floppy disk drives), electro-optical, tape and other storage devices.

The bus interface controller (BIC) 35 couples the CPU local bus 34 with an I/O bus 44. By means of the bus 44, the BIC 35 is coupled with an optional feature bus such as a MICRO CHANNEL bus having a plurality of I/O slots for receiving MICRO CHANNEL adapter cards 45 which may be further connected to an I/O device or memory (not shown). The I/O bus 44 includes address, data, and control components.

Coupled along the I/O bus 44 are a variety of I/O components such as a video signal processor 46 which is associated with video RAM (VRAM) for storing graphic information (indicated at 48) and for storing image information (indicated at 49). Video signals exchanged with the processor 46 may be passed through a Digital to Analog Converter (DAC) 50 to a monitor or other display device. Provision is also made for connecting the VSP 46 directly with what is here referred to as a natural image input/output, which may take the form of a video recorder/player, camera, etc. The I/O bus 44 is also coupled with a Digital Signal Processor (DSP) 51 which has associated instruction RAM 52 and data RAM 54 available to store software instructions for the processing of signals by the DSP 51 and data involved in such processing. The DSP 51 provides for processing of audio inputs and outputs by the provision of an audio controller 55, and for handling of other signals by provision of an analog interface controller 56. Lastly, the I/O bus 44 is coupled with a input/output controller 58 with associated Electrical Erasable Programmable Read Only Memory (EEPROM) 59 by which inputs and outputs are exchanged with conventional peripherals including floppy disk drives, a printer or plotter 14, keyboard 12, a mouse or pointing device (not shown), and by means of a serial port.

Turning now to a specific embodiment of the present subject invention, many users of personal computer systems like that described to this point in the present specification will find the higher resolution provided by 1024×768 CLUT8 to be most useful for mainstream applications, and will not want to give that up in order to utilize multi-media applications such as natural image video if those applications are a secondary focus. For example, a user might be working on a 1024×768 resolution spreadsheet or CAD drawing, but like to have corporate news or a video phone message appear in a window in a corner of the screen. Since the full motion window is not the main focus, the user would accept a more restricted range image quality in order to be able to continue a primary task without the interruption of switching modes and re-rendering all applications to a lower resolution, and without having to buy extra video memory. The method and apparatus of this invention allows a user to view a live full motion window without disturbing other windows that are using the operating system provided standard colors in a CLUT8 mode.

Figure 5:
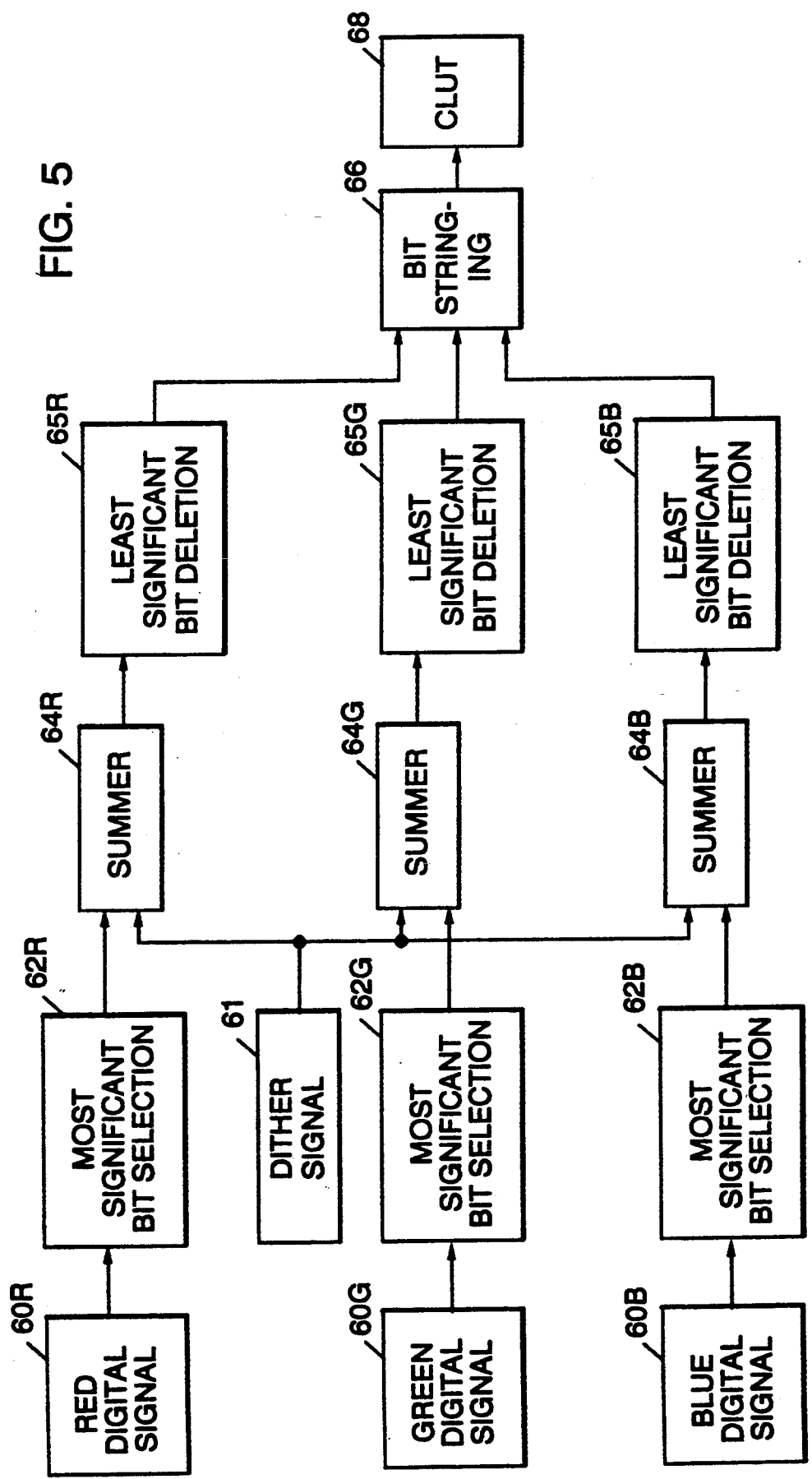
FIG. 5 is a block diagram illustrating a method of compressing digital color signals.

In particular, RGB24 data is converted to RGB8 using ordered dither. Ordered dithering converts high color depth intensity information associated with an image to a lower color depth in a way that allows the discarded low order bits to influence the remaining high order bits of the resultant image. It involves adding pseudo-random noise before a truncation or roundoff process. The input data is RGB24 (eight bits each of red, green, and blue to represent a pixel indicated at 60R, 60G and 60B in FIG. 5). Dithering is used to convert RGB24 data to RGB8 (three bits each of red and green, and two bits of blue to represent a pixel).

In accordance with one approach, a two bit dither value is chosen from a two row by two column matrix with values of 0 and 2 in the first row, and 3 and 1 in the second row. The matrix may, in accordance with this invention, be differently constructed. One alternate may have values of 0 and 3 in the first row amd 2 and 1 in the second row. The modulo two values of the horizontal pixel and vertical scan line counters are used to index into the dither matrix.

In fact, an actual matrix and means for extracting values in the proper sequence is not required. Rather, a simple implementation is to form the least significant bit of the two bit dither value by toggling it every scan line, and form the most significant bit by exclusive-ORing the least significant bit with a value that toggles on every horizontal pixel. Variations on this simplified implementation are contemplated by this invention. For example, the most significant bit may be toggled every scan line with the least significant bit being derived by a process which uses a value toggling every horizontal pixel. To dither an 8 bit value down to an n bit value, the high order n+2 indicated at 62R, 62G and 62B in FIG. 5 bits are added as indicated at 64R, 64G and 64B in FIG. 5 to the two bit dither value indicated at 61 in FIG. 5. The two least significant bits of the sum are dropped as indicated at 65R, 65G and 65B in FIG. 5. The result is then limited to n bits (i.e. values greater than $2^n-1$ are replaced with a value of $2^n-1$). The eight bit red, green and blue values are each dithered down to three, three and two bit values respectively, which are in turn concatenated together as indicated at 66 in FIG. 5 to form an 8 bit RGB8 value. This RGB8 value is stored in video memory where it is used by the Palette DAC of the display adapter as an index into the palette as indicated at 68 in FIG. 5.

Furthermore, to account for situations where pixels are not to be output in a contiguous sequence, such as would be the case when handling one field at a time of an interlaced frame, the operations of toggling values could be replaced by associating values with the least significant bit of the output row and/or column address generators as appropriate.

If it is desired to disengage the dithering operation and replace it with simple rounding, as in the case when the input data is already dithered, this can be done by substituting a constant value of 2 for the dither value.

A problem with RGB8 as described immediately above is that it consumes all 256 entries in the CLUT8 color lookup table. In a windowing environment, the operating system wants to preserve a portion (typically the top and bottom eight or more) of entries in the palette as fixed system colors. Therefore, the 256 colors of RGB8 must be mapped down to down to 240 or less colors. Typically the reduced set must be centered in the palette, although other portions of the palette can be reserved. Centering can be done by detecting whether the three bits of RGB8 associated with red are equal to zero. If they are, the constant 16 is added to the RGB8 value, otherwise the constant 16 is subtracted from the RGB8 value. In either instance, the purpose is to create a modified CLUT index.

Figure 4:
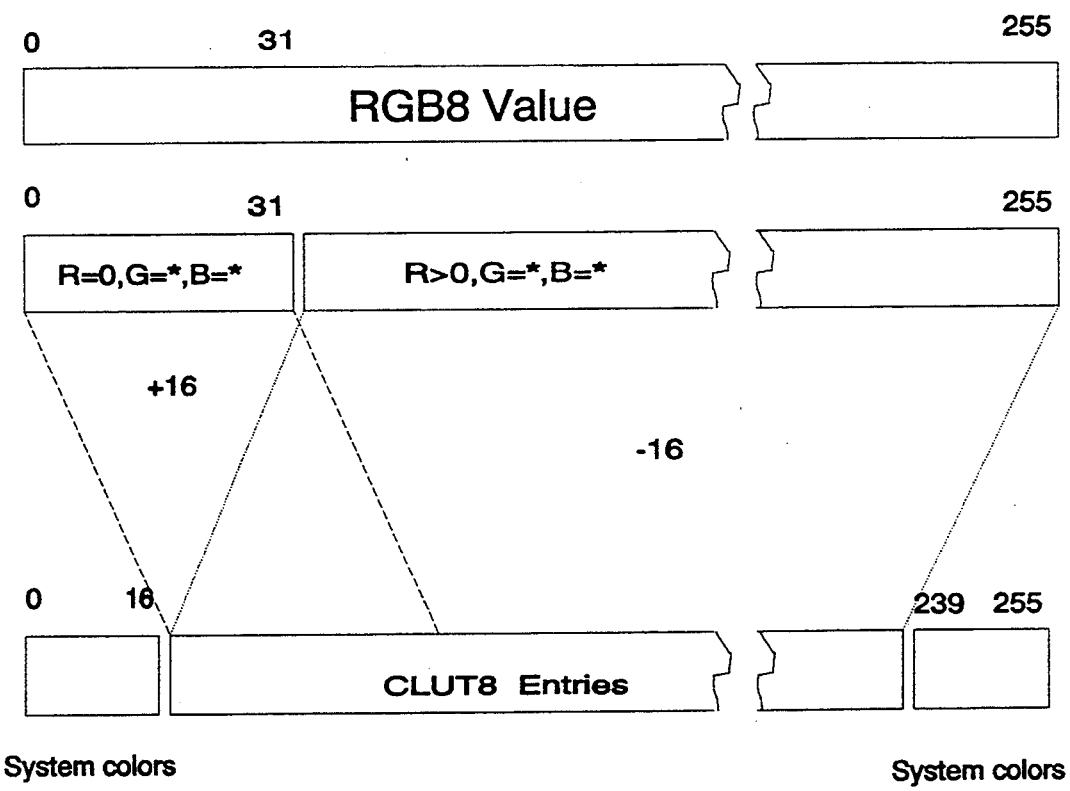
FIG. 4 is a schematic representation of the remapping of a particular number of color look-up table values to a lesser number of values in order to preserve system colors.

By this operation (and as schematically illustrated in FIG. 4), 32 palette entries are freed up and the entries used are centered in the palette. Resulting colors that have a zero value for the red component will have the value 16 added to their CLUT index, while all other colors will have the value 16 subtracted from their CLUT index. This causes only the center 224 entries of the palette to be used. The required hardware operations are very simple. While this will result in colors with red equal to one being folded into the colors with red equal to zero, the consequences are quite subtle (certainly subtle compared to the artifacts introduced by dithering). A one eighth full scale red has been found to be barely visible on a CRT display. This method exploits the fact that the gamma of a CRT causes the CRT to be least sensitive to voltage changes at the bottom of its range, and the realization that the bias of the CRT is usually adjusted to below cutoff in order to avoid a visible background raster. Subjective image quality has not been judged to be compromised with this method by those who have observed its use. Comparable techniques can be used to reserve other predetermined areas of the palette for use as system defined colors if so desired. More involved mapping can be accomplished with a hardware look-up table. It is to be noted that the table resulting in accordance with this invention is other than a conventional RGB8 CLUT.

For example, if thirty two system colors are to be reserved out of the center of the palette rather than the ends, this can be achieved by detecting whether the three bits of RGB8 associated with red are equal to zero and whether the RGB8 value is less than 144. If both conditions are true, then the constant 32 is subtracted from the RGB8 value to create a modified CLUT index. Otherwise, the RGB8 value becomes the CLUT index.

The invention described here can be also used to process RGB16 (5 bits of red, 6 bits of green, and 5 bits of blue) image data into RGB8 and to process RGB24 data into RGB16.

In the latter case, 2048 colors are freed up by converting red values of 1 to red values of 0, and the difference between a red value of one thirty second full scale and zero red is even more subtle.

Red is a good choice of a primary color to fold. The loss of one shade of red out of eight is less pronounced than the loss of one shade of blue out of four because more shades are left. The loss of one shade of red out of eight is less pronounced than the loss of one shade of green out of eight because the eye is less sensitive to red than to green.

As described hereinabove, the method of this invention comprises the steps of: receiving digital color signals representative of color depth intensities of three colors for each pixel to be displayed, each color signal having at least four bits representing the color intensity of a corresponding color for a corresponding pixel and arranged from most to least significant bits; generating a digital dither signal for each pixel to be displayed; summing a selected number of the most significant bits of each received color signal with the corresponding generated dither signal; discarding a selected number of the least significant bits of the summed color and dither signals to compress the corresponding received color signal; stringing together the compressed color signals related to a common pixel to be displayed and generating a digital output signal having a predetermined bit length less than the summed bit lengths of the received digital color signals and representative of the depth intensities of three colors for the common pixel; storing generated digital output signals; and generating analog display driver signals representative of the color intensities of pixels to be displayed by selecting from a color lookup table stored in a digital to analog converter analog signals corresponding to the stored output signals.

The apparatus contemplated by this invention includes a video subsystem which accomplishes compression and display of video signals as described; a personal computer having such a video subsystem; a stored signal compressed as herein described; and storage media such as a hardfile or floppy disc or optical storage media bearing such a stored signal.

In the drawings and specifications there has been set forth a preferred embodiment of the invention and, although specific terms are used, the description thus given uses terminology in a generic and descriptive sense only and not for purposes of limitation.

What is claimed is:

1. A method of compressing digital video color signals derived from a natural image and generating display signals for a color image composed of pixels derived from the compressed signals comprising the steps of:

receiving digital color signals representative of color depth intensities of three colors for each pixel to be displayed, each color signal having at least four bits representing the color intensity of a corresponding color for a corresponding pixel and arranged from most to least significant bits, generating a digital dither signal for each pixel to be displayed, summing a selected number of the most significant bits of each received color signal with the corresponding generated dither signal, discarding a selected number of the least significant bits of the summed color and dither signals to compress the corresponding received color signal, stringing together the compressed color signals related to a common pixel to be displayed and generating a digital output signal having a predetermined bit length less than the summed bit lengths of the received digital color signals and representative of the depth intensities of three colors for the common pixel, storing generated digital output signals, and generating analog display driver signals representative of the color intensities of pixels to be displayed by selecting from a color lookup table stored in a digital to analog converter analog signals corresponding to the stored output signals.

2. A method according to claim 1 wherein the step of generating a digital dither signal comprises the steps of:

forming a least significant bit of a digital dither signal by toggling between first and second values for successive scan lines to be displayed, and forming a most significant bit of a digital dither signal by toggling between third and fourth values for successive pixels to be displayed and then combining the toggled third and fourth value with the toggled first and second value by exclusive-OR selection.

3. A method according to claim 2 wherein said step of receiving digital color signals representative of color depth intensities of three colors for each pixel to be displayed comprises receiving color signals in RGB24 format.

4. A method according to claim 3 wherein said step of generating a digital dither signal for each pixel to be displayed comprises generating a two bit dither signal and further wherein said step of summing a selected number of the most significant bits of each received color signal with the corresponding generated dither signal comprises summing the n+2 most significant bits of the received color signal with the generated two bit dither signal and where n equals the target number of bits to which the compressed color signal is to be limited.

5. A method according to claim 4 wherein said step of discarding a selected number of the least significant bits of the summed color and dither signals to compress the corresponding received color signal comprises discarding such number of the least significant bits of the summed color and dither signals as is necessary to reduce the number of bits remaining to n where n equals the target number of bits to which the compressed color signal is to be limited.

6. A method according to claim 5 wherein n equals 3 for red and green color signals and where n equals 2 for blue color signals.

7. A method according to claim 1 wherein the step of generating a digital dither signal comprises the steps of:
forming a most significant bit of a digital dither signal by toggling between first and second values for successive scan lines to be displayed, and
forming a least significant bit of a digital dither signal by toggling between third and fourth values for successive pixels to be displayed and then combining the toggled third and fourth value with the toggled first and second value by exclusive-OR selection.

8. A method according to claim 7 wherein said step of receiving digital color signals representative of color depth intensities of three colors for each pixel to be displayed comprises receiving color signals in RGB24 format.

9. A method according to claim 8 wherein said step of generating a digital dither signal for each pixel to be displayed comprises generating a two bit dither signal and further wherein said step of summing a selected number of the most significant bits of each received color signal with the corresponding generated dither signal comprises summing the n+2 most significant bits of the received color signal with the generated two bit dither signal and where n equals the target number of bits to which the compressed color signal is to be limited.

10. A method according to claim 9 wherein said step of discarding a selected number of the least significant bits of the summed color and dither signals to compress the corresponding received color signal comprises discarding such number of the least significant bits of the summed color and dither signals as is necessary to reduce the number of bits remaining to n where n equals the target number of bits to which the compressed color signal is to be limited.

11. A method according to claim 10 wherein n equals 3 for red and green color signals and where n equals 2 for blue color signals.

12. A method according to claim 1 further comprising the steps of determining the presence and absence of a zero condition for the bits associated with one color to be displayed, responding to the presence of a zero condition by adding to the output signal a constant value, and responding to the absence of a zero condition by subtracting from the output signal a constant value.

13. A method according to claim 12 wherein said step of generating a digital dither signal for each pixel to be displayed comprises generating a two bit dither signal and further wherein said step of summing a selected number of the most significant bits of each received color signal with the corresponding generated dither signal comprises summing the n+2 most significant bits of the received color signal with the generated two bit dither signal and where n equals the target number of bits to which the compressed color signal is to be limited.

14. A method according to claim 13 wherein said step of discarding a selected number of the least significant bits of the summed color and dither signals to compress the corresponding received color signal comprises discarding such number of the least significant bits of the summed color and dither signals as is necessary to reduce the number of bits remaining to n where n equals the target number of bits to which the compressed color signal is to be limited.

15. A method according to claim 14 wherein n equals 3 for red and green color signals and wherein n equals 2 for blue color signals.

16. A method according to claim 15 wherein the constant value to be added to and subtracted from the output signal is the same for addition and subtraction and excludes from availability for display in response to the output signals a portion of the palette of colors specified in a color lookup table stored in a digital to analog converter, the excluded palette being reserved for use as fixed system colors.

17. A video subsystem for a personal computer capable of driving a display to present a compressed digital video color signal derived from a natural image and comprising:
a digital video processor for receiving digital color signals representative of color depth intensities of three colors for each pixel to be displayed, each color signal having at least four bits representing the color intensity of a corresponding color for a corresponding pixel and arranged from most to least significant bits, said digital video processor (a) generating a digital dither signal for each pixel to be displayed, (b) summing a selected number of the most significant bits of each received color signal with a corresponding generated dither signal, (c) discarding a selected number of the least significant bits of the summed color and dither signals to compress the corresponding received color signal, (d) stringing together the compressed color signals related to a common pixel to be displayed, and (e) generating a digital output signal having a predetermined bit length less than the summed bit lengths of the received digital color signals and representative of the depth intensities of three colors for the common pixel,
video memory operatively connected with said digital video processor for storing output signals generated by said digital video processor, and
a digital to analog converter operatively connected with said video memory and having a register storing a color lookup table of analog signal values to correspond with digital signal values.

18. A video subsystem according to claim 17 wherein said video signal processor in generating a digital dither signal (f) forms a least significant bit of a digital dither signal by toggling between first and second values for successive scan lines to be displayed, and (g) forms a most significant bit of a digital dither signal by toggling between third and fourth values for successive pixels to be displayed and then combining the toggled third and fourth value with the toggled first and second value by exclusive-OR selection.

19. A video subsystem according claim 18 wherein said video signal processor receives color signals in RGB24 format.

20. A video subsystem according to claim 19 wherein said video signal processor generates a two bit dither signal and sums the n+2 most significant bits of the received color signal with the generated two bit dither signal, with n equal to the target number of bits to which the compressed color signal is to be limited.

21. A video subsystem according to claim 20 wherein said video subsystem discards such number of the least significant bits of the summed color and dither signals as is necessary to reduce the number of bits remaining to n where n equals the target number of bits to which the compressed color signal is to be limited.

22. A video subsystem according to claim 21 wherein n equals 3 for red and green color signals and where n equals 2 for blue color signals.

23. A video subsystem according to claim 17 wherein said video processor further (h) determines the presence and absence of a zero condition for the bits associated with one color to be displayed, (i) responds to the presence of a zero condition by adding to the output signal a constant value, and (j) responds to the absence of a zero condition by subtracting from the output signal a constant value.

24. A video subsystem according to claim 23 wherein said video processor generates a two bit dither signal and sums the n+2 most significant bits of the received color signal with the generated two bit dither signal, with n equal to the target number of bits to which the compressed color signal is to be limited.

25. A video subsystem according to claim 24 wherein said video processor discards such number of the least significant bits of the summed color and dither signals as is necessary to reduce the number of bits remaining to n where n equals the target number of bits to which the compressed color signal is to be limited.

26. A video subsystem according to claim 25 wherein n equals 3 for red and green color signals and wherein n equals 2 for blue color signals.

27. A video subsystem according to claim. 26 wherein said video processor adds to and subtracts from the output signal a constant value which is the same for addition and subtraction and excludes from availability for display in response to the output signals a portion of the palette of colors specified in said color lookup table stored in said register of said digital to analog converter, the excluded palette being reserved for use as fixed system colors.

28. A personal computer system capable of displaying an image derived from a digital video color signal which is in turn derived from a natural image, the system comprising:
  a housing,
  a planar board mounted within said housing,
  a microprocessor mounted on said planar board,
  a natural image video reception port operatively connected with said planar board for reception of video signals derived from natural images,
  a video subsystem operatively connected with said port and with planar board and comprising:
    a digital video processor for receiving digital color signals representative of color depth intensities of three colors for each pixel to be displayed, each color signal having at least four bits representing the color intensity of a corresponding color for a corresponding pixel and arranged from most to least significant bits, said digital video processor (a) generating a digital dither signal for each pixel to be displayed, (b) summing a selected number of the most significant bits of each received color signal with a corresponding generated dither signal, (c) discarding a selected number of the least significant bits of the summed color and dither signals to compress the corresponding received color signal, (d) stringing together the compressed color signals related to a common pixel to be displayed, and (e) generating a digital output signal having a predetermined bit length less than the summed bit lengths of the received digital color signals and representative of the depth intensities of three colors for the common pixel,
    video memory operatively connected with said digital video processor for storing output signals generated by said digital video processor, and
    a digital to analog converter operatively connected with said video memory and having a register storing a color lookup table of analog signal values to correspond with digital signal values, and
  a display operatively connected with said video subsystem.

29. A personal computer system according to claim 28 wherein said video signal processor in generating a digital dither signal (f) forms a least significant bit of a digital dither signal by toggling between first and second values for successive scan lines to be displayed, and (g) forms a most significant bit of a digital dither signal by toggling between third and fourth values for successive pixels to be displayed and then combining the toggled third and fourth value with the toggled first and second value by exclusive-OR selection.

30. A personal computer system according claim 29 wherein said video signal processor receives color signals in RGB24 format.

31. A personal computer system according to claim 30 wherein said video signal processor generates a two bit dither signal and sums the n+2 most significant bits of the received color signal with the generated two bit dither signal, with n equal to the target number of bits to which the compressed color signal is to be limited.

32. A personal computer system according to claim 31 wherein said video subsystem discards such number of the least significant bits of the summed color and dither signals as is necessary to reduce the number of bits remaining to n where n equals the target number of bits to which the compressed color signal is to be limited.

33. A personal computer system according to claim 32 wherein n equals 3 for red and green color signals and where n equals 2 for blue color signals.

34. A personal computer system according to claim 28 wherein said video processor further (h) determines the presence and absence of a zero condition for the bits associated with one color to be displayed, (i) responds to the presence of a zero condition by adding to the output signal a constant value, and (j) responds to the absence of a zero condition by subtracting from the output signal a constant value.

35. A personal computer system according to claim 34 wherein said video processor generates a two bit dither signal and sums the n+2 most significant bits of the received color signal with the generated two bit dither signal, with n equal to the target number of bits to which the compressed color signal is to be limited.

36. A personal computer system according to claim 35 wherein said video processor discards such number of the least significant bits of the summed color and dither signals as is necessary to reduce the number of bits remaining to n where n equals the target number of bits to which the compressed color signal is to be limited.

37. A personal computer system according to claim 36 wherein n equals 3 for red and green color signals and wherein n equals 2 for blue color signals.

38. A personal computer system according to claim 37 wherein said video processor adds to and subtracts from the output signal a constant value which is the same for addition and subtraction and excludes from availability for display in response to the output signals a portion of the palette of colors specified in said color lookup table stored in said register of said digital to analog converter, the excluded palette being reserved for use as fixed system colors.

39. A compressed digital video color signal stored in a storage memory device of a personal computer system and representing a natural image video signal compressed in color depth intensity, the video color signal comprising digital pixel data blocks for each of a plurality of pixels to be displayed by an analog driven display, each pixel data block having a predetermined number of bits of data less than the number of bits of data necessary to digitize a corresponding pixel of the natural image video signal with full color depth intensity, the pixel data blocks having been formed by receiving digital color signals representative of color depth intensities of three colors for each pixel to be displayed, each color signal having at least four bits representing the color intensity of a corresponding color for a corresponding pixel and arranged from most to least significant bits, generating a digital dither signal for each pixel to be displayed, summing a selected number of the most significant bits of each received color signal with the corresponding generated dither signal, discarding a selected number of the least significant bits of the summed color and dither signals to compress the corresponding received color signal, stringing together the compressed color signals related to a common pixel to be displayed and generating a digital output signal having a predetermined bit length less than the summed bit lengths of the received digital color signals and representative of the depth intensities of three colors for the common pixel, storing generated digital output signals, generating analog display driver signals representative of the color intensities of pixels to be displayed by selecting from a color lookup table stored in a digital to analog converter analog signals corresponding to the stored output signals.

40. A compressed digital video color signal stored in a storage memory device of a personal computer system and representing a natural image video signal compressed in color depth intensity, the video color signal comprising digital pixel data blocks for each of a plurality of pixels to be displayed by an analog driven display, each pixel data block having a predetermined number of bits of data less than the number of bits of data necessary to digitize a corresponding pixel of the natural image video signal with full color depth intensity, the pixel data blocks having been formed in accordance with the method of claim 1.

41. A digital storage device bearing a compressed digital video color signal representing a natural image video signal compressed in color depth intensity, the storage device comprising:
   a digital signal storage memory device; and
   a compressed digital video color signal comprising digital pixel data blocks for each of a plurality of pixels to be displayed by an analog driven display, each pixel data block having a predetermined number of bits of data less than the number of bits of data necessary to digitize a corresponding pixel of the natural image video signal with full color depth intensity, the pixel data blocks having been formed by receiving digital color signals representative of color depth intensities of three colors for each pixel to be displayed, each color signal having at least four bits representing the color intensity of a corresponding color for a corresponding pixel and arranged from most to least significant bits, generating a digital dither signal for each pixel to be displayed, summing a selected number of the most significant bits of each received color signal with the corresponding generated dither signal, discarding a selected number of the least significant bits of the summed color and dither signals to compress the corresponding received color signal, stringing together the compressed color signals related to a common pixel to be displayed and generating a digital output signal having a predetermined bit length less than the summed bit lengths of the received digital color signals and representative of the depth intensities of three colors for the common pixel, storing generated digital output signals, generating analog display driver signals representative of the color intensities of pixels to be displayed by selecting from a color lookup table stored in a digital to analog converter analog signals corresponding to the stored output signals.

42. A digital storage device bearing a compressed digital video color signal representing a natural image video signal compressed in color depth intensity, the storage device comprising:
   a digital signal storage memory device; and
   a compressed digital video color signal comprising digital pixel data blocks for each of a plurality of pixels to be displayed by an analog driven display, each pixel data block having a predetermined number of bits of data less than the number of bits of data necessary to digitize a corresponding pixel of the natural image video signal with full color depth intensity, the pixel data blocks having been formed in accordance with the method of claim 1.

* * * * *